(12) United States Patent
Kim et al.

(10) Patent No.: US 10,733,973 B2
(45) Date of Patent: Aug. 4, 2020

(54) VEHICLE AND METHOD FOR CONTROLLING THEREOF

(71) Applicants: HYUNDAI MOTOR COMPANY, Seoul (KR); KIA MOTORS CORPORATION, Seoul (KR)

(72) Inventors: Young Kim, Hwaseong-si (KR); Yonghwan Hwang, Hwaseong-si (KR); Jaehyuk Jang, Seoul (KR); Minsik Yang, Seoul (KR); HyeonHee Kang, Uijeongbu-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 0 days.

(21) Appl. No.: 16/550,963

(22) Filed: Aug. 26, 2019

(65) Prior Publication Data

US 2020/0193956 A1    Jun. 18, 2020

(30) Foreign Application Priority Data

Dec. 14, 2018    (KR) .................. 10-2018-0162224

(51) Int. Cl.
*G10K 11/178*    (2006.01)
*B60H 1/00*    (2006.01)

(52) U.S. Cl.
CPC ... G10K 11/17823 (2018.01); B60H 1/00564 (2013.01); B60H 2001/006 (2013.01); G10K 2210/1282 (2013.01); G10K 2210/3044 (2013.01); G10K 2210/3056 (2013.01)

(58) Field of Classification Search
CPC .......... G10K 11/17823; G10K 11/178; G10K 11/1788; G10K 11/1784; G10K 11/1786; G10K 2201/1282; G10K 2201/3044; G10K 2201/3056; G10K 2201/1081; B60H 1/00564; B60H 2001/006; H04R 1/1083
USPC ........................................ 381/71.4, 71.1, 86
See application file for complete search history.

(56) References Cited

U.S. PATENT DOCUMENTS

| 9,631,639 | B1 * | 4/2017 | Shinsato | F04D 27/001 |
| 2012/0031983 | A1 * | 2/2012 | Shirota | F24F 1/0011 236/49.3 |
| 2012/0171947 | A1 * | 7/2012 | Takeda | F24F 1/0007 454/251 |
| 2015/0189433 | A1 * | 7/2015 | Ganeshkumar | H04R 3/002 381/71.4 |
| 2015/0239320 | A1 * | 8/2015 | Eisenhour | B60H 1/00757 454/75 |

(Continued)

*Primary Examiner* — Ahmad F. Matar
*Assistant Examiner* — Sabrina Diaz
(74) *Attorney, Agent, or Firm* — Brinks Gilson & Lione

(57) ABSTRACT

The present disclosure relates to a vehicle and a method for controlling thereof, and more particularly to a technique for removing noise generated in a vehicle air conditioner. The vehicle may include an air conditioner, comprising: a speaker configured to output sound; a blower fan configured to blow air that is heat-exchanged in the air conditioner; an air vent configured to regulate a discharge amount of the air discharged into the vehicle; and a controller configured to sense a noise acoustic signal of the blower fan that is determined corresponding to an opening degree of the air vent, and to control the speaker to to output by generating an acoustic signal having an opposite phase to the sensed noise acoustic signal.

14 Claims, 8 Drawing Sheets

(56) References Cited

U.S. PATENT DOCUMENTS

2016/0084268 A1\* 3/2016 Cocks ................... H02P 23/00
                                                                                     415/1

\* cited by examiner

VEHICLE AND METHOD FOR CONTROLLING THEREOF

CROSS-REFERENCE TO RELATED APPLICATION(S)

The present application claims priority to and the benefit of Korean Patent Application No. 10-2018-0162224, filed on Dec. 14, 2018, which is incorporated herein by reference in its entirety.

TECHNICAL FIELD

The present disclosure relates to a vehicle and a method for controlling thereof, and more particularly to a technique for removing noise generated in a vehicle air conditioner.

BACKGROUND

The statements in this section merely provide background information related to the present disclosure and may not constitute prior art.

A vehicle means a device that can carry people or goods to a destination while driving on roads or tracks. The vehicle can be moved to various positions mainly by using one or more wheels installed in the vehicle body. Such a vehicle may be a three-wheeled or four-wheeled vehicle, or a two-wheeled vehicle such as a motorcycle, a construction machine, a bicycle, and a train traveling on a rail arranged on a railroad.

Generally, a heating ventilation and air conditioning (HVAC) system includes a cooling system for cooling an interior of an automobile and a heating system for heating an interior of the automobile. Such an air conditioning system is a device for controlling air in a vehicle based on a method of obtaining a cold wind by using heat exchanged air by blowing air to the surface of the evaporator, since the refrigerant is compressed by using the power unit of the automobile and the refrigerant is condensed again into the outside air, then rapidly expanded and then evaporated, so that the refrigerant takes away heat from the outside when evaporating and becomes cold, and obtaining a hot wind by blowing air on the surface of a heater using cooling water heated by an engine using heat generated by burning fuel in a power generating device.

The air discharged from the air conditioning system is discharged to the inside of the vehicle through an air vent (air outlet) provided inside the vehicle. On the other hand, noise is generated due to rotation of the blower fan for blowing air generated from the air conditioning system.

Further, depending on a degree of opening or closing of the air vent, there is a restriction on the flow of air discharged into the vehicle interior, which may cause an increase in noise generated from the air conditioning system.

That is, as the degree of opening of the air vent is smaller, the flow of air is not smooth, so that the noise generated from the air conditioning system is increased.

In recent years, studies is being conducted to methods for removing noise by determining the degree of noise generated from the air conditioning system of a vehicle.

SUMMARY

One aspect of the present disclosure is to remove noise generated from an air conditioning system, by determining a degree of opening and closing of an air vent through a vibrator speaker provided in an air conditioning system of a vehicle and by identifying the noise of the air conditioning system and generating and outputting the an acoustic signal having opposite phase to the noise.

In one form of the present disclosure, there is provided a vehicle including an air conditioner, comprising: a speaker device configured to output sound; a blower fan configured to blow air heat-exchanged in the air conditioner; an air vent configured to regulate a discharge amount of the heat exchanged air discharged into the vehicle; and a controller configured to sense a noise acoustic signal of the blower fan determined in correspondence with an opening degree of the air vent, and to control to be output by the speaker by generating an acoustic signal having opposite phase to the sensed noise acoustic signal.

In addition, the controller may determine a spring constant of the speaker device to be changed based on the degree of opening of the air vent.

In addition, the controller may determine the resonance frequency of the speaker device to be changed based on the determined spring constant of the speaker device.

In addition, the controller may determine an amount of current consumption of the speaker device to be changed based on the determined resonance frequency of the speaker device and determine an opening degree of the air vent based on the determined amount of current consumption of the speaker device.

In addition, the controller may determine a spring constant of the speaker device to be increased corresponding to an increase in the pressure of the heat exchanged air if the degree of opening of the air vent is less than a predetermined value, and determine a resonance frequency of the speaker device to be increased corresponding to the increased spring constant of the speaker device, and determine an amount of current consumption of the speaker device to be increased based on the increased resonance frequency of the speaker device, and determine an opening degree of the air vent corresponding to the determined amount of current consumption of the speaker device.

In addition, the vehicle further includes a memory for storing a size of the noise acoustic signal of the blower fan to be determined corresponding to the degree of opening of the air vent, wherein the memory may store a data on the degree of opening of the air vent determined in accordance with an amount of current consumption of the speaker device.

In addition, the speaker device includes a vibrator speaker device that outputs sound by vibration of a diaphragm, and may cancel the noise acoustic signal of the blower fan by outputting an acoustic signal having opposite phase to the noise acoustic signal in accordance with the control of the controller.

Further, in another form of the present disclosure, there is provided a method of controlling a vehicle, comprising: controlling an opening degree of an air vent to regulate a discharge amount of heat exchanged air from a blower fan discharged into a vehicle; sensing a noise acoustic signal of the blower fan determined corresponding to an opening degree of the air vent; generating an acoustic signal having opposite phase to the sensed noise acoustic signal; and controlling the generated acoustic signal to be outputted through a speaker device.

The method may further include determining a spring constant of the speaker device to be changed based on the degree of opening of the air vent.

The method may further include determining a resonance frequency of the speaker device to be changed based on the determined spring constant of the speaker device.

The method may further include determining an amount of current consumption of the speaker device to be changed based on the determined resonance frequency of the speaker device, and determining an opening degree of the air vent based on the determined amount of current consumption of the speaker device.

The method may further include determining a spring constant of the speaker device to be increased corresponding to an increase in the pressure of the heat exchanged air if the degree of opening of the air vent is less than a predetermined value, and determining a resonance frequency of the speaker device to be increased corresponding to the increased spring constant of the speaker device, and determine an amount of current consumption of the speaker device to be increased based on the increased resonance frequency of the speaker device, and determining an opening degree of the air vent corresponding to the determined amount of current consumption of the speaker device.

The method may further include storing the size of a noise acoustic signal of the blower fan to be determined corresponding to the degree of opening of the air vent, and storing a data on the degree of opening of the air vent to be determined corresponding to an amount of current consumption of the speaker device.

The method may further include canceling the noise acoustic signal of the blower fan by controlling to output an acoustic signal having opposite phase to the noise acoustic signal.

Some forms of the present disclosure eliminate the noise generated from the air conditioning system by determining the opening and closing degree of the air vent through the vibrator speaker provided in the air conditioning system of the vehicle and by generating and outputting an acoustic signal having opposite phase to a noise by sensing the noise of the air conditioning system. In addition, since the noise generated from the air conditioning system is removed, the sound related to vehicle control such as media sound, navigation sound, and warning sound inside the vehicle can be effectively transmitted.

Further areas of applicability will become apparent form the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
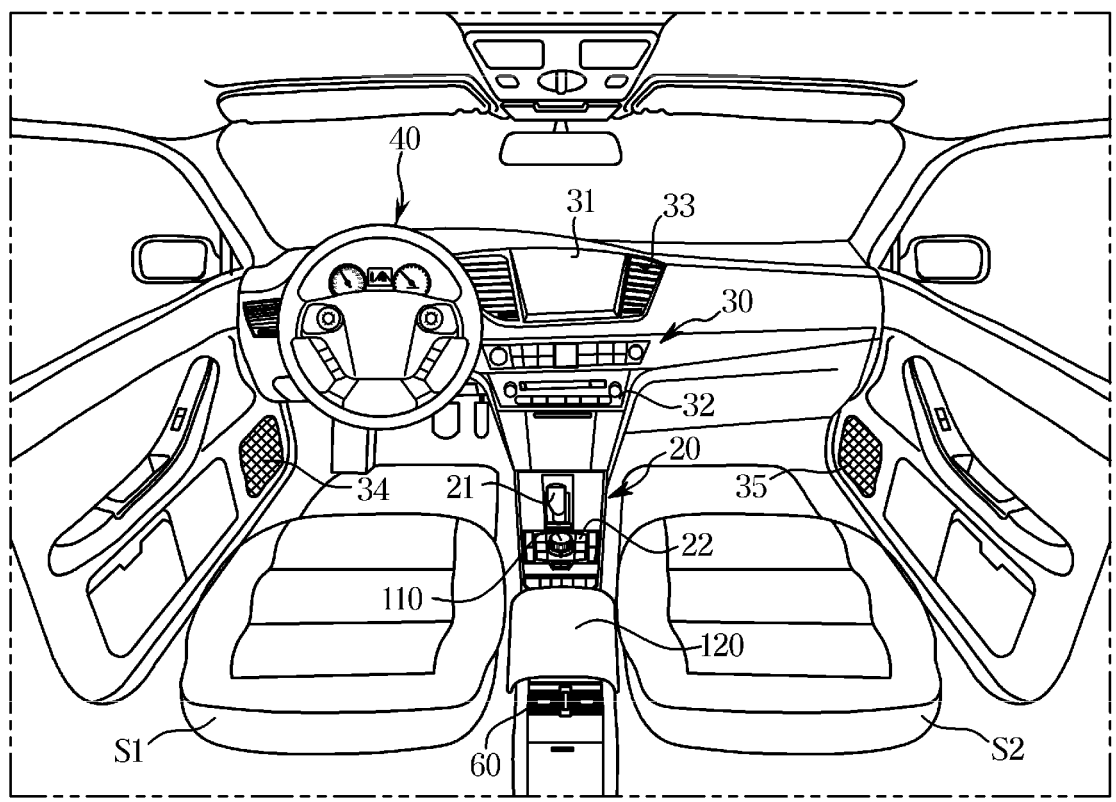
FIG. 1 is a view showing a configuration inside a vehicle in one form of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

DETAILED DESCRIPTION

The following description is merely exemplary in nature and is not intended to limit the present disclosure, application, or uses. It should be understood that throughout the drawings, corresponding reference numerals indicate like or corresponding parts and features.

Like reference numerals refer to like elements throughout the specification. The terms "unit," "module," "member," and "block" used herein may be implemented by hardware or software. It is also possible that a plurality of units, modules, members, and blocks are implemented as one element, or one unit, module, member, or block includes a plurality of elements in accordance with some forms of the present disclosure.

Throughout the specification, when an element is referred to as being "connected" to another element, it may be directly connected or indirectly connected to another element. The indirect connection includes a connection through a wireless communication network.

In addition, when some part "includes" some elements, unless explicitly described to the contrary, it means that other elements may be further included but not excluded.

Throughout the specification, when a member is referred to as being located "on" another member, a third member may be present between the two members in addition to the two members being in contact.

The terms such as "first" or "second" may be used to distinguish one element from another, but the elements are not limited to the terms Singular forms are intended to include plural forms unless the context clearly indicates otherwise.

Reference numerals of operations are used for convenience of description, and the reference numerals do not indicate the order of the operations. The operations may be performed in an order that is different from the described order unless a specific order is clearly described in context.

Hereinafter, an operation principle and some forms of the present disclosure will be described with reference to the accompanying drawings.

FIG. 1 is a view showing a configuration inside a vehicle in some forms of the present disclosure.

With reference to FIG. 1, the vehicle 1 may include a dashboard provided with seats S1 to S4 on which a passenger sits inside the main body, a gear box 20, a center fascia 30, and a steering wheel 40, etc.

The seat S1 to S4 allow the driver to operate the vehicle 1 in a comfortable and stable posture and may include a driver's seat S1 for seating the driver; an passenger seat S2 of positioned forward of the main body together with the driver seat S1; a left seat S3 and a right seat S4 positioned rearward of the main body.

The gear box 20 may be provided with a transmission gear for the transmission of the vehicle 1.

In addition, as shown, the gear box 20 may be provided with input devices 22 for controlling the performance of the main functions of a navigation device 31 or the vehicle 1 by the user.

The center fascia 30 may be provided with an air vent 33 for discharging the heat-exchanged air from the air conditioner into the vehicle 1, a clock, an audio device 32 and the navigation device 31, etc.

The air vent 33 is configured to comfortably maintain the interior of the vehicle 1 by adjusting the temperature, humidity, air cleanliness, and air flow inside the vehicle 1 according to the degree of opening and closing.

The air vent 33 may be installed in the center fascia 30 and may include at least one outlet for discharging air.

The air vent 33 may be opened or closed depending on the movement of a plurality of blind boards provided on the outlet. That is, depending on the degree of opening or closing of the air vent 33, the heat-exchanged air from the air conditioning system may be smoothly discharged or may not be discharged.

Figure 4:
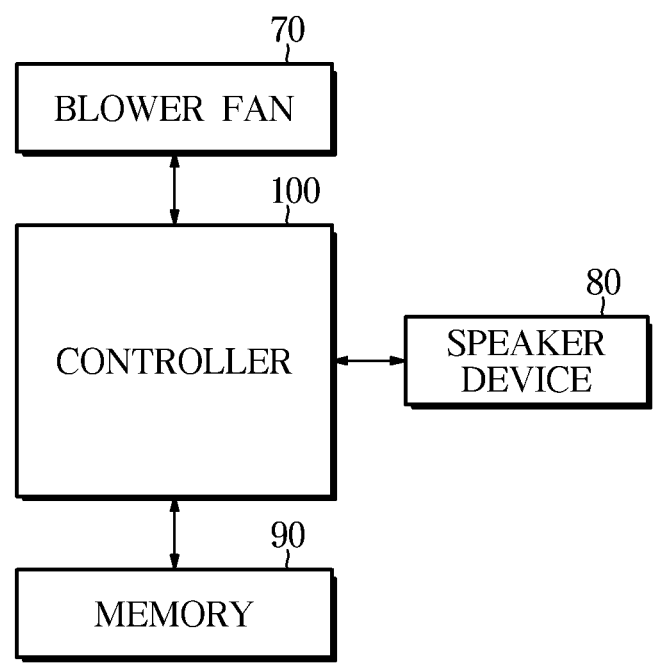
FIG. 4 is a control block diagram of a vehicle in one form of the present disclosure.

This air vent 33 can adjust the degree of opening and closing of the passenger of the vehicle 1 and may be automatically opened or closed depending on the control of the controller 100 (see FIG. 4).

The center fascia 30 may be provided with a button or a dial or the like for controlling the air conditioner etc. A user such as a driver can control the air conditioner of the vehicle 1 by using a button or a dial disposed on the center fascia 30.

In some forms of the present disclosure, the navigation device 31 may be installed in the center fascia 30. The navigation device 31 may be formed to be embedded in the center fascia 30 of the vehicle 1. The center fascia 30 may be provided with an input unit for controlling the navigation device 31 in some forms of the present disclosure. In some forms of the present disclosure, the input unit of the navigation device 31 may be installed at a different location than the center fascia 30. For example, the input unit of the navigation device 31 may be formed around a display unit of the navigation device 31. As another example, the input unit of the navigation device 31 may be installed in the gear box 20 or the like.

The audio device 32 includes an operation panel having a plurality of buttons for performing various functions. The audio device may provide a radio mode for providing radio functions and a media mode for playing audio files of various storage media containing audio files. The buttons formed on the operation panel of the audio device 32 are divided into buttons providing functions related to performing the radio mode, buttons providing functions related to performing the media mode, and buttons commonly used in the said two modes.

The audio device 32 can transmit sound through a speaker provided inside the main body. The speaker may include a speaker 34 provided on the left door of the driver's seat S1, a speaker 35 provided on the right door of the passenger seat S2, and a speaker provided on a back seat.

The steering wheel 40 is a device for adjusting the running direction of the vehicle 1 and includes a rim gripped by a driver, and a spoke connected to the steering device of the vehicle 1 and connecting the hub of the rotary shaft for steering with the rim.

In some forms of the present disclosure, the dashboard may further include various instrument panels capable of displaying the traveling speed, the engine speed or the remaining amount of fuel of the vehicle 1, and a globe box capable of storing various objects.

The input device 110 may be installed in the gear box 20 in the vehicle, as shown in FIG. 1. The gear box 20 may be installed generally between the driver's seat S1 and the passenger seat S2 inside the vehicle, and may be provided with or embedded with a gear stick 21 for transmission and various components related to the transmission.

In some forms of the present disclosure, various buttons may be installed outside the gear box 20. The input devices (110) can be arranged in a knob type that can be grasped by the user and can be rotated. That is, the input device 110 may be implemented in the form of a dial operation device, as shown in FIG. 3 in some forms of the present disclosure.

Various buttons for assisting the function of the input device 110 or performing separate independent functions may be provided around the input device 110.

Figure 2:
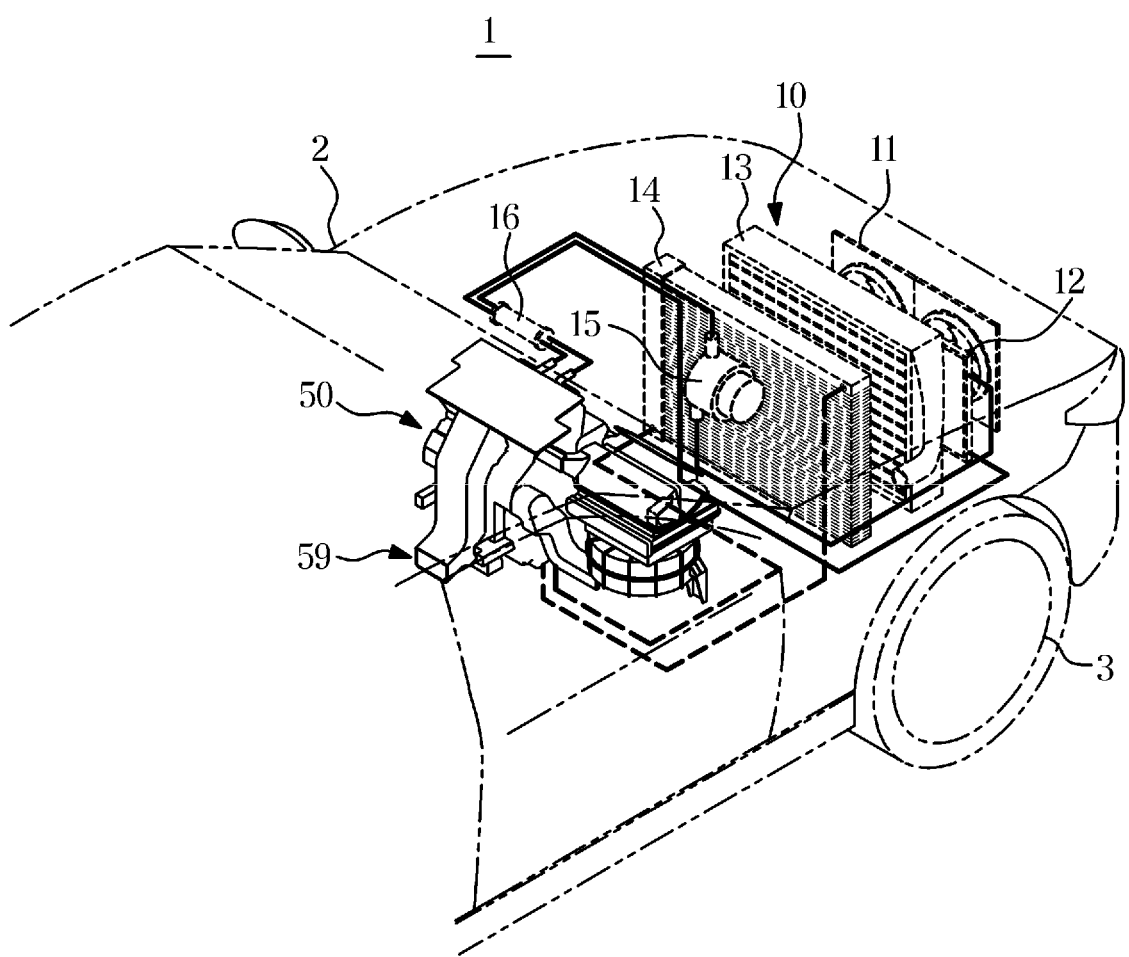
FIG. 2 is a view schematically showing an air conditioner provided in a vehicle in one form of the present disclosure.
Figure 3:
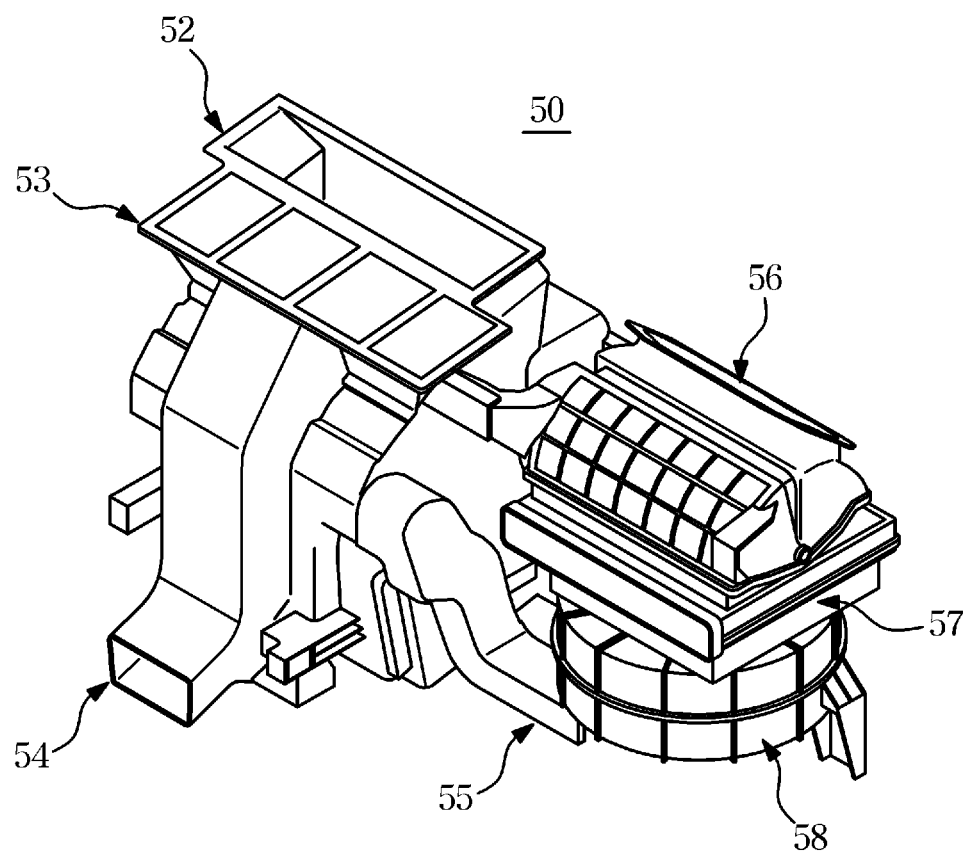
FIG. 3 is a view for explaining an HVAC in one form of the present disclosure.

FIG. 2 is a view schematically showing an air conditioner provided in a vehicle in some forms of the present disclosure, and FIG. 3 is a view for explaining an HVAC in some forms of the present disclosure.

With reference to FIG. 2, The vehicle 1 includes a main body 2 configured to form an outer appearance of the vehicle, a wheel 3 configured to move the vehicle 1, a driving device (not shown) configured to rotate the wheel 3, and a steering wheel configured to control the wheel (3).

Specifically, the driving device provides rotational force to the wheel 3 so that the main body 2 moves forward or backward. Such a driving device may employ an engine for generating a rotational force by burning a fossil fuel, or a motor for generating a rotational force by receiving power from a capacitor or the like.

On the other hand, the vehicle 1 further includes an air conditioner 10 for controlling the air in the interior of the vehicle 1 in addition to the driving device. A user aboard a seat or the like inside the main body 2 can see an outlet 59 for discharging air controlled by the air conditioner 10 and an input button (not shown). However, the air conditioner 10 includes various configurations for air control.

The heat-exchanged air through the air conditioner 10 can be discharged into the vehicle 1 via the air vent 33 through the outlet 59.

Specifically, the air conditioner 10 includes an inlet 11 configured to air outside the vehicle 1 in front of the main body 2; a filter unit 12 configured to filter air; a condenser (13) configured to cool a high temperature refrigerant to outside air and to make it in a liquefied state; a radiator (14) configured to discharge the part of generated heat to the outside through cooling water; a compressor (15) configured to circulate and compress the refrigerant to increase the pressure; a receiver 16 configured to perform a function of storing refrigerant, separating bubbles, and the like; and an evaporator (not shown) configured to make the liquid refrigerant introduced from the expansion valve (not shown) into a low-temperature and low-pressure refrigerant state and to cool the air inside the main body 2 through heat exchange.

On the one hand, as shown in FIG. 1, the evaporator may be provided behind the center fascia provided in the interior of the vehicle 1 where the passenger is located.

The air conditioner 10 further includes an air conditioning equipment, that is, an HVAC (Heating, Ventilation, Air Conditioning) 50, in order to control the air in the interior on which the user is aboard, together with the above-described evaporator.

With reference to FIG. 3, the HAVC 50 viewed from the driver's seat is provided with a first outlet 52 for discharging air toward the front glass of the main body 2; a second outlet 53 for discharging air in the direction of the chest of the passenger; a third outlet 54 for discharging air to the back seat of the vehicle 1 through a pipe; a fourth outlet 55 for discharging air to the feet of a user onboard the passenger seat or the like; a duct 56 for introducing indoor air inside the main body 2; an antibacterial filter 57 for filtering the introduced indoor air, a motor 58 for controlling the flow of the indoor air mentioned above; and an evaporator.

When the air conditioner 10 performs cooling, the evaporator is connected to the duct 56 to cool the air, as described above with reference to FIG. 2. Specifically, the room air introduced through the duct 56 passes through the antibacterial filter 57 by the motor 58, and then flows to the evaporator.

On the other hand, when the air conditioner 10 performs heating, the air passing through the evaporator reaches the heater core (not shown). The heater core uses the cooling water of the engine to heat the air. The temperature of the cooling water heated by the engine is raised by the heater core.

The air that has been heat-exchanged by the air conditioner 10 can be blown through the blower fan 70 (see FIG. 4) and discharged to the inside of the vehicle 1 through the air vent 33 as described above.

At this time, due to the noise generated from the air blower fan 70, the voice recognition rate for the Bluetooth communication sound in the vehicle 1 may be lowered, and even when the passenger listens to the music, there are also disturbed.

In this case, as the rotational speed of the blower fan 70 increases, the noise generated from the blower fan 70 increases.

When the user closes a certain portion of the air vent 33 and air that has been heat-exchanged from the air conditioner 10 is not smoothly discharged into the vehicle 1, the air pressure in the space where the air conditioner 10 is located is increased, and the noise generated from the blower fan 70 is also increased accordingly.

That is, the size of the noise generated from the air blower fan 70 and flowing into the vehicle 1 may vary depending on the degree of opening or closing of the air vent 33.

Therefore, according to the vehicle and the method for controlling thereof in some forms of the present disclosure, it is possible to detect the degree of opening of the air vent 33, determine the size of the corresponding noise, and remove the noise generated from the blower fan 70 by generating and outputting a signal having opposite phase to the sensed noise.

Figure 5:
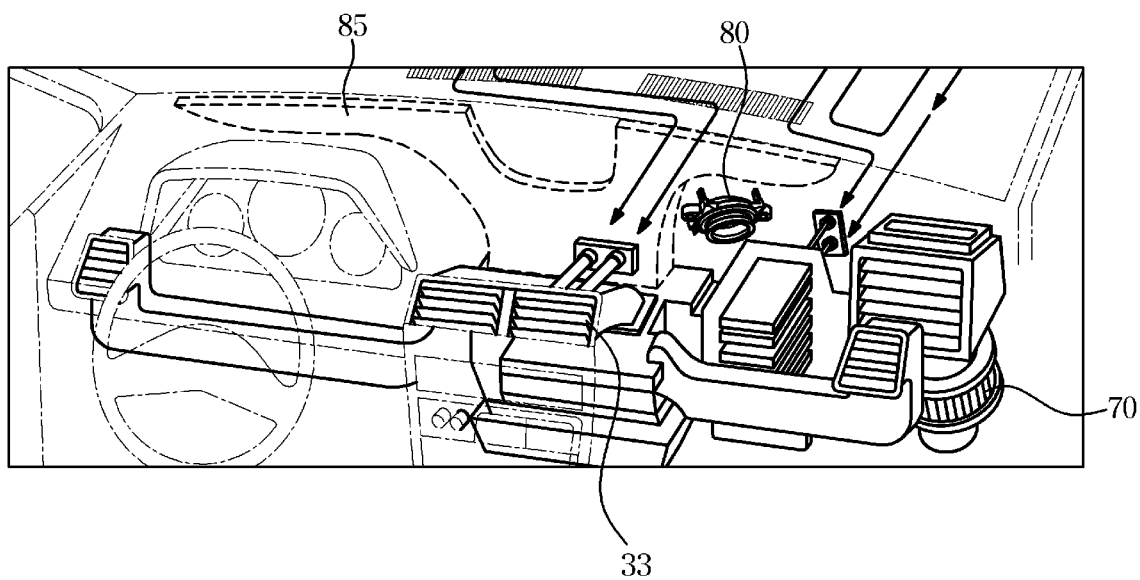
FIG. 5 is an internal configuration diagram of a vehicle provided with an air conditioner and a speaker device in one form of the present disclosure.
Figure 6:
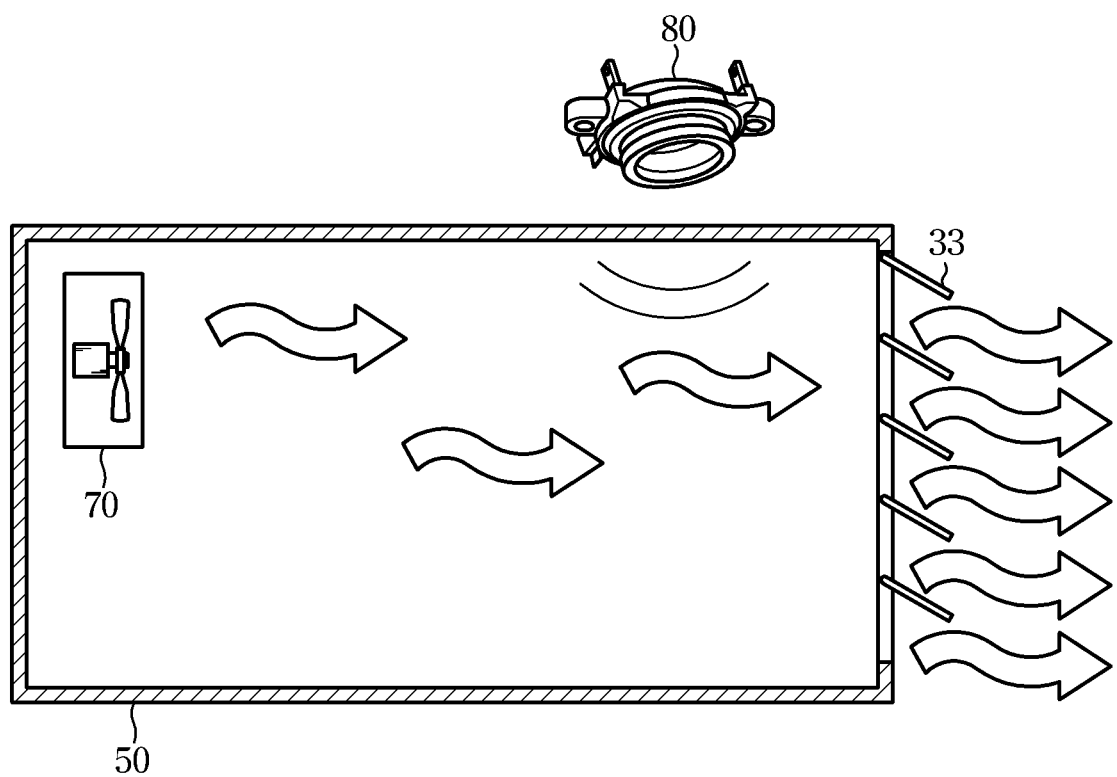
FIGS. 6 and 7 illustrate the flow of heat-exchanged air according to the degree of opening of an air vent in one form of the present disclosure.
Figure 7:
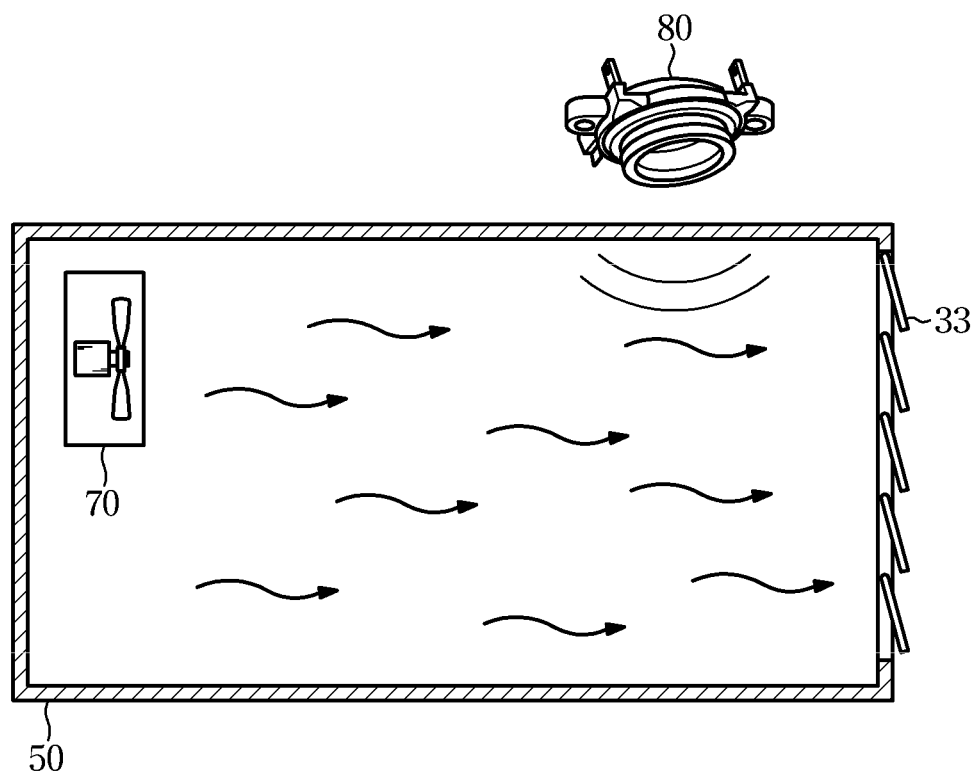
Figure 8:
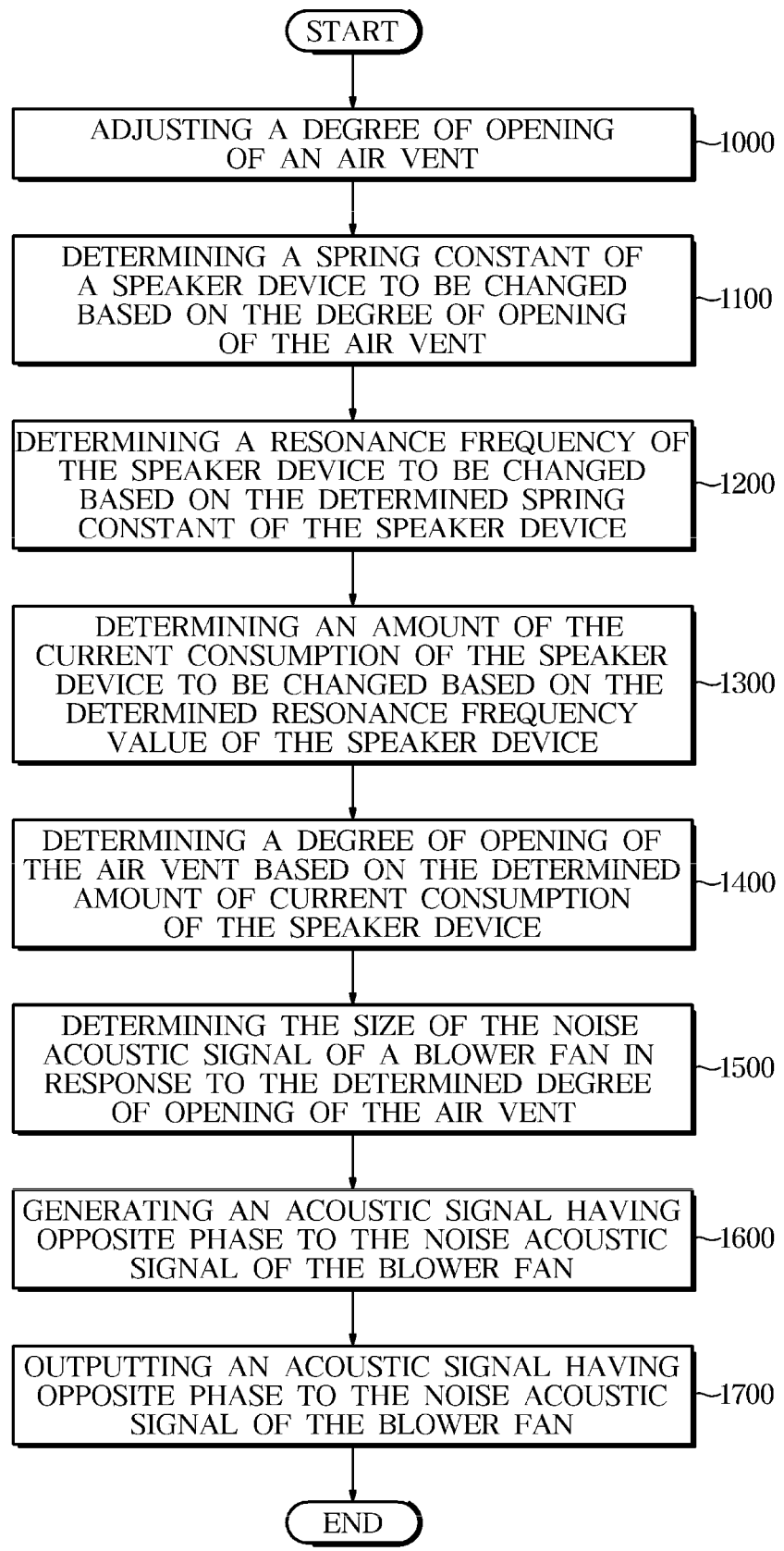
FIG. 8 is a flowchart showing a control method of a vehicle in one form of the present disclosure.

FIG. 4 is a control block diagram of a vehicle in some forms of the present disclosure. FIG. 5 is an internal configuration diagram of a vehicle provided with an air conditioner and a speaker device in some forms of the present disclosure. FIGS. 6 to 7 illustrate the flow of heat-exchanged air according to the degree of opening of an air vent in some forms of the present disclosure. FIG. 8 is a flowchart showing a control method of a vehicle in some forms of the present disclosure.

With reference to FIG. 4, the vehicle 1 in some forms of the present disclosure includes a blower fan 70, a speaker device 80, a memory 90, and a controller 100.

With reference to FIG. 5, the blower fan 70 allows the heat exchanged air to be blown from the air conditioner 10.

In the blower fan 70, the air blown from the heat exchanged air from the air conditioner 10 is discharged to the inside of the vehicle through the air vent 33, and noise is generated inside the vehicle 1 due to the noise generated from the blower fan 70.

The noise generated from the blower fan 70 increases as the rotational speed of the blower fan 70 increases, and the noise increases as the opening degree of the air vent 33 decreases as described above.

As shown in FIG. 5, the speaker device 80 may be provided at a predetermined position inside the vehicle 1, and may be located near the air conditioner 10 to output sound.

Such a speaker device 80 can be realized as an vibrator speaker that outputs sound by vibration of a diaphragm, and the sound outputted from the vibrator speaker can vibrate through an air duct 85 through which heat-exchanged air flows from the air conditioner 10 to output sound.

The speaker device 80 may cancel the noise acoustic signal of the blower fan 70 by outputting an acoustic signal having opposite phase to the noise acoustic signal generated from the blower fan 70, as described hereafter.

That is, the controller 100 generates an acoustic signal having opposite phase to the noise acoustic signal generated from the blower fan 70 and controls the acoustic signals to be output through the speaker device 80, thereby reducing the noises generated from the air conditioner 10 by removing the noise signal before the noise generated from the blower fan 70 is introduced into the vehicle 1.

As shown in FIGS. 6 and 7, the air vent 33 may be open or closed depending on the movement of a plurality of blind boards provided on the outlet.

That is, depending on the degree of opening or closing of the air vent 33, the heat-exchanged air from the air conditioning system may be smoothly discharged or may not be discharged.

As shown in FIG. 6, when the air vent 33 is entirely opened, since the heat-exchanged air from the air conditioner 10 can be smoothly discharged into the interior of the vehicle 1, the noise generated due to the air vent 33 restricting the flow of air is relatively small although the noise generated by the blower fan 70 itself exists.

On the other hand, as shown in FIG. 7, when the air vent 33 is entirely closed, since the heat-exchanged air from the air conditioner 10 cannot be smoothly discharged into the interior of the vehicle 1, the noise generated by the air blower fan 70 itself and the noise caused by the restriction of the air flow by the air vent 33 also becomes relatively large.

That is, when the air vent 33 restricts the flow of air, the pressure of the air in the space where the air conditioner 10 is located is increased, and accordingly, the noise generated from the blower fan 70 also increases.

Therefore, the controller 100 can detect the degree of opening of the air vent 33 and generate an opposite phase signal for removing the noise signal generated in the blower fan 70 accordingly.

Specifically, when the blower fan 70 is operated and the degree of opening of the air vent 33 is adjusted (1000), the controller 100 can detect a noise acoustic signal of the blower fan 70 determined in accordance with the degree of opening of the air vent 33.

That is, the controller 100 can sense noise due to the operation of the blower fan 70, and furthermore, can detect noise that varies depending on the degree of opening of the air vent 33. The noise signal sensed by the controller 100 may include the size of the noise signal, the phase of the noise signal, and the waveform of the noise signal.

The opening degree of the air vent 33 may be manually adjusted by the user or may be automatically adjusted according to the control of the controller 100.

The controller 100 may determine the spring constant of the speaker device 70 to be changed based on the degree of opening of the air vent 33 (1100).

As described above, the speaker device 70 is implemented as a vibrator speaker device in which sound is output by vibration of the diaphragm.

Accordingly, the vibrator speaker device has a spring constant value according to the structure of the vibrator provided therein, and the spring constant value of the vibrator speaker device does not change but the spring constant value of the vibrator speaker device can be changed if the air pressure in the space where the air conditioner is located is changed according to the flow state of the heat exchanged air.

That is, when the spring constant value of the speaker device 80 is '$K_{spk}$' and the spring constant value to be changed when the air pressure is '$K_{air}$', the total spring constant value of the speaker device 80 is '$K_{spk}+K_{air}$'.

As shown in FIG. 7, when the air vent 33 is entirely closed, the air vent restricts the flow of air, so that the air pressure in the space where the air conditioner 10 is located is increased, and the spring constant value '$K_{air}$' becomes larger as the pressure is increased.

That is, the controller 100 can obtain data on the spring constant value of the vibrator speaker device and determine the resonance frequency of the speaker device 80 to be changed based on the spring constant of the speaker device 80 (1200).

The resonance frequency f of the speaker device 80 can be expressed by Formula 1.

$$f = \frac{1}{2\pi}\sqrt{\frac{K_{spk} + K_{air}}{M_{spk}}} \quad \text{[Formula 1]}$$

At this time, '$M_{spk}$' is the mass of the speaker device 80, '$K_{spk}$' is the spring constant value of the speaker device 80 itself, and '$K_{air}$' is a spring constant value to be changed in accordance with a change in the air pressure inside the air conditioner 10.

Based on Formula 1, when the air vent restricts the flow of air and the air pressure in the space where the air conditioner is located is increased, '$K_{air}$' increases, thereby increasing the resonance frequency of the speaker device.

The resonance frequency of the speaker device 80 is set to a predetermined value, but the resonance frequency of the speaker device 80 changes according to the flow of air as described above.

The controller 100 can acquire data on the changed resonance frequency value of the speaker device 80 based on Formula 1.

The controller 100 can determine the amount of the current consumption of the speaker device 80 based on the resonance frequency value of the speaker device 80 (1300).

As the resonance frequency of the speaker device 80 increases, the amount of current consumed by the speaker device 80 increases.

Specifically, the current consumption is minimized when the resonance frequency of the speaker device is equal to the frequency of use, and the amount of current consumed by the speaker device increases when the resonance frequency is increased while the frequency of use is not changed.

That is, when the resonance frequency of the speaker device 80 is changed, the amount of the current consumption of the speaker device 80 increases at a specific use frequency. The controller 100 can acquire data on the current consumption to be increased in response to the increase of the resonance frequency of the speaker device 80.

The controller 100 may determine the degree of opening of the air vent 33 based on the amount of current consumption by the speaker device 80 (1400).

The memory 90 stores data on the degree of opening of the air vent 33 corresponding to the amount of the current consumption of the speaker device 80.

The memory 90 stores a data table of the degree of opening of the air vent 33 matched with the amount of the current consumption consumed by the speaker device 80, and the controller 100 can determines the current degree of opening of the air vent 33 by matching the contents of the data table stored in the memory 90 when the amount of the current consumption of the speaker device 80 is determined in the above-described manner.

The data table stored in the memory 90 may be a value previously set and stored on the design of the vehicle 1 or may be a value for experimental data obtained through experiments.

That is, the controller 100 can acquire data on how much the air vent 33 is open based on how much the speaker device 80 is currently consuming the current.

If the degree of opening of the air vent 33 is determined, the controller 100 may determine the size of the noise acoustic signal of the blower fan 70 in response to the degree of opening of the air vent 33 (1500).

The memory 90 stores the size value of the noise acoustic signal of the blower fan 70 determined in correspondence with the degree of opening of the air vent 33 in the form of a data table, and the controller 100 may determine the size of the current noise acoustic signal of the blower fan 70 by matching with the contents of the data table stored in the memory 90 when the degree of opening of the air vent 33 is determined.

That is, the controller 100 can determine how large the size of the noise signal generated from the blower fan 70 is, based on how much the air vent 33 is currently open.

The controller 100 may generate an acoustic signal having opposite phase to the noise acoustic signal of the blower fan 70 (1600). That is, the controller 100 may generate an opposite phase signal for removing the noise acoustic signal based on the size and the phase of the noise acoustic signal generated from the blower fan 70.

One of the methods by which the controller 100 generates an acoustic signal having opposite phase to the noise acoustic signal of the blower fan 70 can be used by the LMS (Least Mean Square) algorithm. This LMS algorithm which corresponds to a technique commonly used, as method for performing noise canceling on mixed noise data of when data is acquired.

The controller 100 generates an acoustic signal having opposite phase to the noise acoustic signal and controls the acoustic signal to be outputted through the speaker device 80 (1700), thereby canceling the noise acoustic signal generated from the blower fan 70 to remove noise.

As shown in FIGS. 6 and 7, the speaker device 80 can remove the noise generated from the blower fan 70 by outputting the opposite phase acoustic signal generated in accordance with the control of the controller 100, so that the noise generated from the blower fan 70 is not introduced into the vehicle 1 and is not heard by the user.

When the speaker device 80 outputs an opposite phase acoustic signal, the noise is canceled by being coupled with the noise generated from the blower fan 70, so that the noise can be removed in the vicinity of the air vent 33.

As described above, it is effective to eliminate noise generated from the air conditioner 10 by determining the degree of opening and closing of the air vent 33 through the speaker device 80 equipped with the air conditioner 10 of the vehicle 1, and by identifying the resulting noise from the blower fan 70 and generating and outputting noise and opposite phase acoustic signals.

Further, by removing the noise generated from the air conditioner 10, the sound related to the control of the vehicle 1 such as the media sound, the navigation sound and the warning sound inside the vehicle 1 can be effectively transmitted.

Meanwhile, some forms of the present disclosure may be embodied in the form of a recording medium storing instructions executable by a computer. The instructions may be stored in the form of program code and, when executed by a processor, may generate a program module to perform the operations of some forms of the present disclosure. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

The description of the disclosure is merely exemplary in nature and, thus, variations that do not depart from the substance of the disclosure are intended to be within the scope of the disclosure. Such variations are not to be regarded as a departure from the spirit and scope of the disclosure.

DESCRIPTION

1: vehicle
2: air conditioner
33: air vent
50: HAVC
70: blower fan
80: speaker device
90: memory
100: controller

What is claimed is:

1. A vehicle having an air conditioner, comprising:
a speaker configured to output sound;
a blower fan configured to blow air that is heat exchanged in the air conditioner;
an air vent configured to regulate a discharge amount of the air discharged into the vehicle; and
a controller configured to:
sense a noise acoustic signal of the blower fan that is determined corresponding to an opening degree of the air vent; and
control the speaker to output by generating an acoustic signal having an opposite phase to the sensed noise acoustic signal.

2. The vehicle of claim 1, wherein the controller is configured to:
determine a spring constant of the speaker that is changed based on the opening degree of the air vent.

3. The vehicle of claim 2, wherein the controller is configured to:
determine a resonance frequency of the speaker that is changed based on the spring constant of the speaker.

4. The vehicle of claim 3, wherein the controller is configured to:
determine an amount of current consumption of the speaker that is changed based on the resonance frequency of the speaker; and
determine the opening degree of the air vent based on the amount of current consumption of the speaker.

5. The vehicle of claim 4, wherein the controller is configured to:
determine the spring constant of the speaker that increases corresponding to an increase in a pressure of the air when the opening degree of the air vent is less than a predetermined value;
determine the resonance frequency of the speaker that increases corresponding to the increased spring constant of the speaker;
determine the amount of current consumption of the speaker that increases corresponding to the increased resonance frequency of the speaker; and
determine the opening degree of the air vent corresponding to the determined amount of current consumption of the speaker.

6. The vehicle of claim 1, wherein the vehicle further comprises:
a memory configured to:
store a size of a noise acoustic signal of the speaker; and
store a data on the opening degree of the air vent that is determined corresponding to an amount of current consumption of the speaker.

7. The vehicle of claim 1, wherein the speaker further comprises:
a vibrator speaker configured to:
output a sound by vibration of a diaphragm; and
cancel the noise acoustic signal of the blower fan by outputting the acoustic signal.

8. A method of controlling a vehicle, comprising:
controlling an opening degree of an air vent to control a discharge amount of heat-exchanged air discharged into the vehicle through a blower fan;
sensing a noise acoustic signal of the blower fan that is determined corresponding to the opening degree of the air vent;
generating an acoustic signal having an opposite phase to the sensed noise acoustic signal; and
controlling a speaker to output the generated acoustic signal.

9. The method of claim 8, wherein the method further comprises:
determining a spring constant of the speaker that is changed based on the opening degree of the air vent.

10. The method of claim 9, wherein the method further comprises:
determining a resonance frequency of the speaker that is changed based on the spring constant of the speaker.

11. The method of claim 10, wherein the method further comprises:
determining an amount of current consumption of the speaker that is changed based on the resonance frequency of the speaker; and
determining the opening degree of the air vent based on the amount of current consumption of the speaker.

12. The method of claim 11, wherein the method further comprises:
determining the spring constant of the speaker that increases corresponding to an increase in a pressure of the air when the opening degree of the air vent is less than a predetermined value;
determining the resonance frequency of the speaker that increased corresponding to the increased spring constant of the speaker;

determining the amount of current consumption of the speaker that increases corresponding to the increased resonance frequency of the speaker; and determining the opening degree of the air vent corresponding to the determined amount of current consumption of the speaker.

13. The method of claim 8, wherein the method further comprises:

storing a size of the noise acoustic signal of the blower fan; and storing a data on the opening degree of the air vent that is determined corresponding to an amount of current consumption of the speaker.

14. The method of claim 8, wherein the method further comprises:

canceling the noise acoustic signal of the blower fan by outputting the acoustic signal.

\* \* \* \* \*